United States Patent
Hiller et al.

(10) Patent No.: US 12,465,032 B2
(45) Date of Patent: Nov. 11, 2025

(54) FISHING LURE INCLUDING A HYDROFOIL CONFIGURATION

(71) Applicant: Hangry Brand Enterprises, L.L.C., Brighton, MI (US)

(72) Inventors: Michael James Hiller, Brighton, MI (US); Jennifer Leigh Hiller, Brighton, MI (US)

(73) Assignee: Hangry Brand Enterprises, L.L.C., Brighton, MI (US)

( * ) Notice: Subject to any disclaimer, the term of this patent is extended or adjusted under 35 U.S.C. 154(b) by 0 days.

(21) Appl. No.: 18/323,545

(22) Filed: May 25, 2023

(65) Prior Publication Data

US 2023/0380395 A1 Nov. 30, 2023

Related U.S. Application Data

(60) Provisional application No. 63/345,645, filed on May 25, 2022.

(51) Int. Cl.
*A01K 85/14* (2006.01)

(52) U.S. Cl.
CPC .................. *A01K 85/14* (2013.01)

(58) Field of Classification Search
CPC .... A01K 85/14; A01K 85/147; A01K 85/011; A01K 85/012; A01K 85/013; A01K 85/00
USPC .............. 43/42.5, 42.52, 42.32, 42.33, 42.34
See application file for complete search history.

(56) References Cited

U.S. PATENT DOCUMENTS

| | | | | | |
|---|---|---|---|---|---|
| 1,115,743 | A | * | 11/1914 | Selig | A01K 85/14 D22/129 |
| 1,179,964 | A | * | 4/1916 | Robertson | A01K 85/14 43/42.34 |
| 1,326,821 | A | * | 12/1919 | Ackerman | A01K 85/14 43/42.34 |
| 1,463,858 | A | * | 8/1923 | Wandve | A01K 85/14 43/42.34 |
| 1,803,056 | A | * | 4/1931 | Davis | A01K 85/14 43/42.5 |
| 1,846,130 | A | * | 2/1932 | Martin | A01K 85/14 43/42.34 |
| 1,862,917 | A | * | 6/1932 | Anderson | A01K 85/14 43/42.49 |
| 1,871,377 | A | * | 8/1932 | Khoenle | A01K 85/14 43/42.5 |

(Continued)

*Primary Examiner* — Monica L Perry
*Assistant Examiner* — Maria E Graber
(74) *Attorney, Agent, or Firm* — Howard & Howard Attorneys PLLC

(57) ABSTRACT

A fishing lure includes a fishing lure spoon body. The spoon body includes a relatively flat forward section including an attachment feature capable of being secured to a fishing line. The spoon body further includes a longitudinally flat central section offset from the relatively flat forward section. The spoon body further includes an S-shaped section connected to and transitioning between the relatively flat forward section and the longitudinally flat central section. The spoon body further includes a trailing edge portion curving toward the relatively flat forward section. The fishing lure further includes at least one hook. The spoon body is convex upon a first side and concave upon a second side. The spoon body is configured for creating hydrodynamic lift when the spoon body is pulled through the water.

12 Claims, 8 Drawing Sheets

(56) References Cited

U.S. PATENT DOCUMENTS

| | | | | |
|---|---|---|---|---|
| 1,924,350 A | * | 8/1933 | Cordell | A01K 85/14 43/42.5 |
| 1,938,266 A | * | 12/1933 | Tucker | A01K 85/14 43/42.5 |
| 1,969,944 A | * | 8/1934 | Reinard | A01K 85/14 43/42.5 |
| 1,978,843 A | * | 10/1934 | Jensen | A01K 85/14 43/42.5 |
| 2,043,001 A | | 6/1936 | Lambrecht | |
| D106,059 S | * | 9/1937 | Raymond | D22/131 |
| 2,164,415 A | | 7/1939 | Mallett | |
| 2,214,266 A | * | 9/1940 | Haury | A01K 85/14 D22/129 |
| 2,478,085 A | * | 8/1949 | Bruington | A01K 85/14 43/42.5 |
| D155,133 S | * | 9/1949 | Dow | D22/131 |
| 2,624,147 A | * | 1/1953 | Round | A01K 85/14 43/42.34 |
| 2,657,495 A | * | 11/1953 | Eppinger | A01K 85/14 43/42.34 |
| 2,706,868 A | * | 4/1955 | Homer | A01K 85/14 43/42.52 |
| 2,721,414 A | | 10/1955 | Ross | |
| 2,731,757 A | | 1/1956 | Porth | |
| 2,765,570 A | | 10/1956 | Sedivy | |
| 2,787,860 A | | 4/1957 | Carr | |
| 2,795,076 A | * | 6/1957 | Luft | A01K 85/14 43/42.49 |
| 2,796,693 A | * | 6/1957 | Gunterman | A01K 85/14 43/42.32 |
| 2,819,554 A | * | 1/1958 | Neale | A01K 85/14 D22/131 |
| 3,153,298 A | * | 10/1964 | Lemon | A01K 85/14 43/42.03 |
| D203,997 S | | 3/1966 | Wells | |
| 3,305,964 A | * | 2/1967 | Wieszeck | A01K 85/16 43/42.03 |
| 3,461,595 A | | 8/1969 | Roes | |
| 3,656,253 A | * | 4/1972 | Gaunt | A01K 91/065 43/42.34 |
| 3,673,727 A | * | 7/1972 | Bauer | A01K 85/14 43/42.5 |
| 3,724,117 A | * | 4/1973 | Flanagan, Jr. | A01K 85/14 43/42.32 |
| D228,553 S | * | 10/1973 | Sanderson | D22/131 |
| 3,881,271 A | * | 5/1975 | Jacura | A01K 85/14 43/42.5 |
| 4,122,624 A | * | 10/1978 | Smith | A01K 85/14 43/42.5 |
| 4,201,006 A | * | 5/1980 | Wetherald | A01K 85/00 43/42.51 |
| 4,479,323 A | * | 10/1984 | Burr | A01K 85/14 43/42.51 |
| 4,536,987 A | * | 8/1985 | Sanders | A01K 85/16 43/42.34 |
| 4,713,906 A | * | 12/1987 | Distaffen | A01K 85/14 43/42.5 |
| D374,907 S | | 10/1996 | Ketchum | |
| 5,857,283 A | * | 1/1999 | Perrick | A01K 85/08 43/42.39 |
| 5,887,378 A | * | 3/1999 | Rhoten | A01K 85/14 43/42.23 |
| 6,202,338 B1 | * | 3/2001 | Carr | A01K 85/14 43/42.34 |
| D658,739 S | | 5/2012 | Thomson | |
| 8,650,797 B2 | | 2/2014 | Sugita et al. | |
| D707,325 S | | 6/2014 | Li | |
| 8,782,945 B2 | * | 7/2014 | Jones | A01K 85/14 43/42.5 |
| 9,049,852 B1 | * | 6/2015 | Moran, Jr. | A01K 85/14 |
| 9,545,087 B2 | * | 1/2017 | Elgin | A01K 85/14 |
| 2002/0056222 A1 | * | 5/2002 | Andersen | A01K 85/14 43/42.5 |

* cited by examiner

FISHING LURE INCLUDING A HYDROFOIL CONFIGURATION

CROSS-REFERENCE TO RELATED APPLICATIONS

This disclosure claims priority to Provisional Patent Application No. 63/345,645 filed on May 25, 2022, which is hereby incorporated by reference.

BACKGROUND

The disclosure generally relates to a fishing lure including a hydrofoil configuration.

Fishing lures include devices attached to a fishing line and configured for enticing a fish to strike or attempt to eat the lure. A spoon is a type of fishing lure and may include a stamped metallic body. In some embodiments, a spoon may include a substantially uniform thickness, and the stamped metallic body may include a convex side and a concave side. A barbed hook or a plurality of barbed hooks may be attached to a trailing or aft portion of the spoon. In one embodiment, a non-barbed hook configured to reduce impact to the mouth of a gamefish may be utilized. A forward or fore portion of the spoon may include a hole, a ring, or attachment feature configured for receiving fishing line to be tied to the spoon.

Anglers may utilize different fishing methods with spoons. An angler may cast the lure into a body of water and crank a reel handle to retrieve the spoon. An angler may jig a spoon in the water, letting the lure settle according to gravity and then alternatingly raise and lower the end or tip of the fishing rod to make the spoon correspondingly raise and lower in the water. An angler may troll a spoon behind a boat, wherein the boat moves in a forward direction at some constant or near constant speed, the spoon is allowed to trail behind the boat with some length of fishing line being let out from the fishing rod and reel, and the spoon will follow behind the boat at some desired distance, frequently with the lure settling to some distance below the surface of the water, which depth may be influenced by how much line is let out from the fishing rod and reel, a weight of the lure, a shape and resulting hydrodynamics of the lure, and currents in the water.

SUMMARY

A fishing lure is provided. The fishing lure includes a fishing lure spoon body. The fishing lure spoon body includes a relatively flat forward section including an attachment feature capable of being secured to a fishing line. The fishing lure spoon body further includes a longitudinally flat central section offset from the relatively flat forward section. The fishing lure spoon body further includes an S-shaped section connected to and transitioning between the relatively flat forward section and the longitudinally flat central section. The fishing lure spoon body further includes a trailing edge portion curving toward the relatively flat forward section. The fishing lure further includes at least one hook. The fishing lure spoon body is convex upon a first side and concave upon a second side. The fishing lure spoon body is configured for creating hydrodynamic lift when the fishing lure spoon body is pulled through the water.

In some embodiments, at least the longitudinally flat central section and the S-shaped section are arcuate and each include raised rims and a depressed center.

In some embodiments, the fishing lure spoon body includes a uniform thickness.

In some embodiments, the longitudinally flat central section being offset from the relatively flat forward section is configured for causing the longitudinally flat central section to face downward due to gravity as the fishing lure spoon body is pulled through the water.

In some embodiments, a width of the fishing lure spoon body may be in a range from 18% to 22% as compared to a longitudinal length of the fishing lure spoon body.

According to one alternative embodiment, a fishing lure system is provided. The fishing lure system includes a fishing line including a longitudinal axis of the fishing line and a fishing lure connected to the fishing line. The fishing lure includes a fishing lure spoon body. The fishing lure spoon body includes a relatively flat forward section configured to be in line with the longitudinal axis of the fishing line when the fishing lure is pulled through water. The fishing lure spoon body further includes a longitudinally flat central section offset from the longitudinal axis of the fishing line and the relatively flat forward section. The fishing lure spoon body further includes an S-shaped section connected to and transitioning between the relatively flat forward section and the longitudinally flat central section. The fishing lure spoon body further includes a trailing edge portion curving toward the relatively flat forward section. The fishing lure further includes at least one hook. The fishing lure spoon body is convex upon a first side and concave upon a second side. The fishing lure spoon body is configured for creating hydrodynamic lift when the fishing lure spoon body is pulled through the water.

In some embodiments, at least the longitudinally flat central section and the S-shaped section are arcuate and each include raised rims and a depressed center.

In some embodiments, the fishing lure spoon body includes a uniform thickness.

In some embodiments, the longitudinally flat central section being offset from the relatively flat forward section is configured for causing the longitudinally flat central section to face downward due to gravity as the fishing lure spoon body is pulled through the water.

In some embodiments, a width of the fishing lure spoon body may be in a range from 18% to 22% as compared to a longitudinal length of the fishing lure spoon body.

According to one alternative embodiment, a fishing lure spoon body is provided. The fishing lure spoon body includes a relatively flat forward section including an attachment feature capable of being secured to a fishing line. The fishing lure spoon body further includes a longitudinally flat central section offset from the relatively flat forward section. The fishing lure spoon body further includes an S-shaped section connected to and transitioning between the relatively flat forward section and the longitudinally flat central section. The fishing lure spoon body further includes a trailing edge portion curving toward the relatively flat forward section. The fishing lure spoon body is convex upon a first side and concave upon a second side. The fishing lure spoon body is configured for creating hydrodynamic lift when the fishing lure spoon body is pulled through the water.

In some embodiments, at least the longitudinally flat central section and the S-shaped section are arcuate and each include raised rims and a depressed center.

In some embodiments, the fishing lure spoon body includes a uniform thickness.

In some embodiments, the longitudinally flat central section being offset from the relatively flat forward section is configured for causing the longitudinally flat central section to face downward due to gravity as the fishing lure spoon body is pulled through the water.

In some embodiments, a width of the fishing lure spoon body may be in a range from 18% to 22% as compared to a longitudinal length of the fishing lure spoon body.

The above features and advantages and other features and advantages of the present disclosure are readily apparent from the following detailed description of the best modes for carrying out the disclosure when taken in connection with the accompanying drawings.

DETAILED DESCRIPTION

Figure 1:
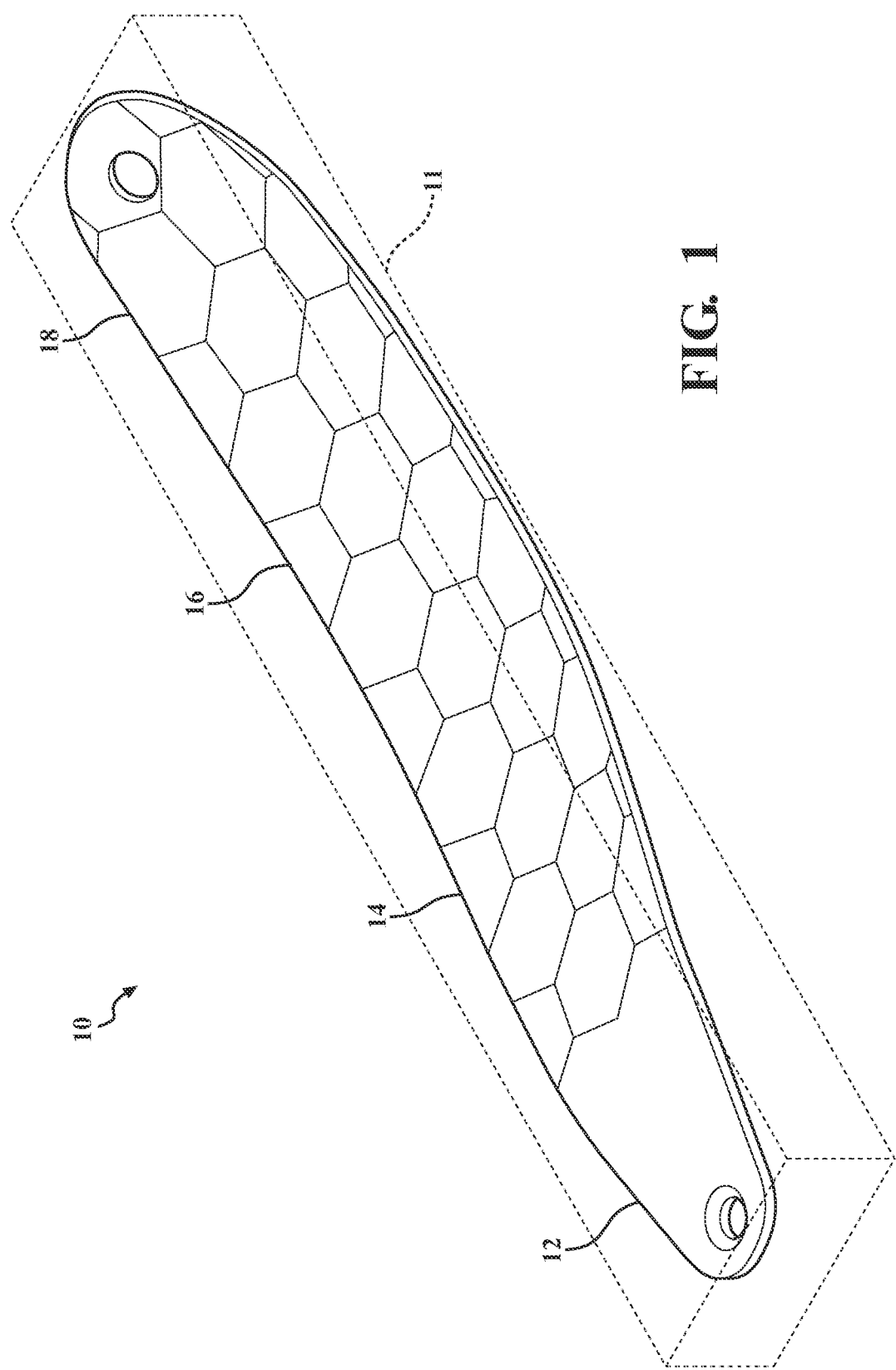
FIG. 1 schematically illustrates in perspective view an exemplary fishing lure spoon body including features configured for creating hydrodynamic lift acting upon the fishing lure spoon body as the fishing lure spoon body moves through water, in accordance with the present disclosure.

A device embodied as a fishing lure is provided. The fishing lure includes a fishing lure spoon body and at least one barbed hook attached thereto. The fishing lure spoon body is made of a rigid material, such as metal, plastic, or ceramic material. The spoon body may be painted or printed upon with fish-attractive, decorative, or advertising graphics on one or both sides. One or both sides may be polished or coated with chrome or some other shiny material to create a flash-effect. One side is convex and the other is concave to achieve the spoon shape. The material may be of substantially constant thickness. The spoon shape may be created by stamping the shape out of an originally flat material.

The fishing lure spoon body includes an arcuate shape. The arcuate shape may be configured for achieving particular behaviors of the fishing lure as the fishing lure is pulled through water. The arcuate shape may be configured for maintaining roll stability, meaning that the fishing lure does not tend to spin in the water or turn about an axis parallel to a longitudinal axis of a fishing line pulling the lure, but rather the fishing lure tends to maintain a stable angular orientation about a longitudinal axis of the fishing lure body. This roll stability in the fishing lure may be created by making a mass of the fishing lure spoon body substantially off-center or out of line with the longitudinal axis of the fishing line. As the fishing lure is pulled through the water, the weight of the fishing lure spoon body tends to cause the fishing lure to rotate about the longitudinal axis of the fishing line until the off-center weight of the fishing lure spoon body is oriented downward.

The arcuate shape may further be configured as a hydrofoil or a shape configured for creating hydrodynamic lift, meaning that as the fishing lure moves through water, the flow of the water creates an upward force upon a bottom surface of the fishing lure spoon body and causes the fishing lure to move upward in the water. In one embodiment, a bottom surface of the fishing lure body may resemble a bottom surface of a hull of a motorboat with a keel curving upward at the bow.

Force applied to a bottom surface of the fishing lure spoon body by the hydrodynamic lift, if of sufficient magnitude, may cause the fishing lure to rise above a depth in the water that the fishing lure would be without the hydrodynamic lift acting upon the fishing lure spoon body. In one embodiment, depending upon a shape of the fishing lure spoon body and a speed of the fishing lure spoon body relative to the water, the hydrodynamic lift may be sufficient to cause the fishing lure to move toward a surface of the water. In one embodiment, the fishing lure may continue upward until the fishing lure breaks a surface of the water. In another embodiment, as water currents and an angle of the fishing line attached to the fishing lure relative to the surface of the water change, the force of the hydrodynamic lift may reduce or the fishing lure spoon body may wobble or turn slightly, causing an interruption in the hydrodynamic lift, causing the fishing lure to plunge back to or near a depth at which the fishing lure would run without the hydrodynamic lift. As the off-center weight of the fishing lure spoon body causes the fishing lure to reorient in an orientation where the hydrodynamic lift acts again upon a bottom surface of the fishing lure, the fishing lure may again move upward toward the surface of the water. This upward movement followed by a plunge, followed by the lure reorienting for a next upward movement may iteratively repeat as the lure is pulled through the water at a constant or near constant speed.

Referring now to the drawings, wherein like reference numbers refer to like features throughout the several views, FIG. 1 schematically illustrates in perspective view an exemplary fishing lure spoon body 10 including features configured for creating hydrodynamic lift acting upon the fishing lure spoon body 10 as the fishing lure spoon body 10 moves through water. The illustrated fishing lure spoon body 10 includes four exemplary sections, a relatively flat forward section 12 including an attachment feature capable of being secured to a fishing line, a longitudinally flat central section 16 offset from the relatively flat forward section 12, an S-shaped section 14 transitioning between the relatively flat forward section 12 and the longitudinally flat central section 16, and a trailing edge portion 18. A construction line box 11 is drawn around the perspective view of the fishing lure spoon body 10 for purposes of illustration.

The relatively flat forward section 12 may be planar. It may include a small cup shape, with a rim around the exposed sides and a depressed center. The trailing edge portion 18 may be planar. It may include a small cup shape, with a rim around the exposed sides and a depressed center.

At least the longitudinally flat central section 16 and the S-shaped section 14 are arcuate or curved when observed in sections taken from side to side. The longitudinally flat central section 16 and the S-shaped section 14 collectively define a spoon shape or a cupped shape including a depressed center portion and raised rims on either side, where one could define a volume that could be contained within the spoon shape or cup shape. Each of the longitudinally flat central section 16 and the S-shaped section 14 include raised side rims and a depressed center. The longitudinally flat center section 16 is flat along the longitudinal axis of the fishing lure spoon body 10, meaning that if the fishing lure spoon body 10 were set upon a flat surface, a length of the bottom side of the longitudinally flat center section 16 at the depressed center would either rest upon the flat surface or would be very close to the flat surface. The longitudinally flat center section 16 is shaped like an arcuate trough without ends.

The trailing edge portion 18 is upon an aft side of the fishing lure spoon body 10. The longitudinally flat central section 16 is offset from the relatively flat forward section 12, meaning that each are oriented to be parallel to a longitudinal axis of the fishing lure spoon body 10, which the longitudinally flat central section 16 is offset in a direction perpendicular from the longitudinal axis of the fishing lure spoon body 10 by a distance as compared to the relatively flat forward section 12. The trailing edge portion 18 is attached to an aft or rearward portion of the longitudinally flat central section 16 and angles back toward the relatively flat forward section 12. Without the trailing edge portion 18, the remainder of the fishing lure spoon body 10 when pulled through the water would center about a longitudinal axis of the fishing line pulling the fishing lure, with a center of mass of the fishing lure spoon body 10 being in line with the longitudinal axis of the fishing line. The trailing edge portion 18 bending upwardly causes a hydrodynamic force to push downwardly upon the trailing edge portion 18, much as an elevator fin on a tail of an airplane, when lifted into an up position, causes a downward force to be applied to the tail of the airplane. This downward force upon the trailing edge portion 18 causes the fishing lure spoon body 10 to move downward and to be offset from the longitudinal axis of the fishing line. This effect of being offset from longitudinal axis of the fishing line has two effects in lure behavior: 1) the center of mass of the fishing lure spoon body 10 is off-center from the longitudinal axis of the fishing line and thereby will tend to not spin and settle with the center of mass of the fishing lure spoon body pointed downward, and 2) a bottom surface of the S-shaped section 14 is rotated downward and presents a face angled with respect to oncoming water that pushes the oncoming water downward away from the bottom surface. This pushing of the oncoming water downward acts like the curved bow of boat pushing through water, lifting upwardly on the boat. As the bottom surface of the S-shaped section 14 pushes downwardly upon the oncoming water, an equal and opposite hydrodynamic lift force is applied to the bottom surface of the S-shaped section 14. In this way, the trailing edge portion 18 causes a downward force to push upon the trailing edge portion 18, which causes the fishing lure spoon body 10 to be off-center from the longitudinal axis of the fishing line, resulting in increased stability of the fishing lure spoon body 10 in an upright orientation and causes the S-shaped section 14 to present an angled face to oncoming water to generate an upward lift upon the fishing lure spoon body 10.

Figure 2:
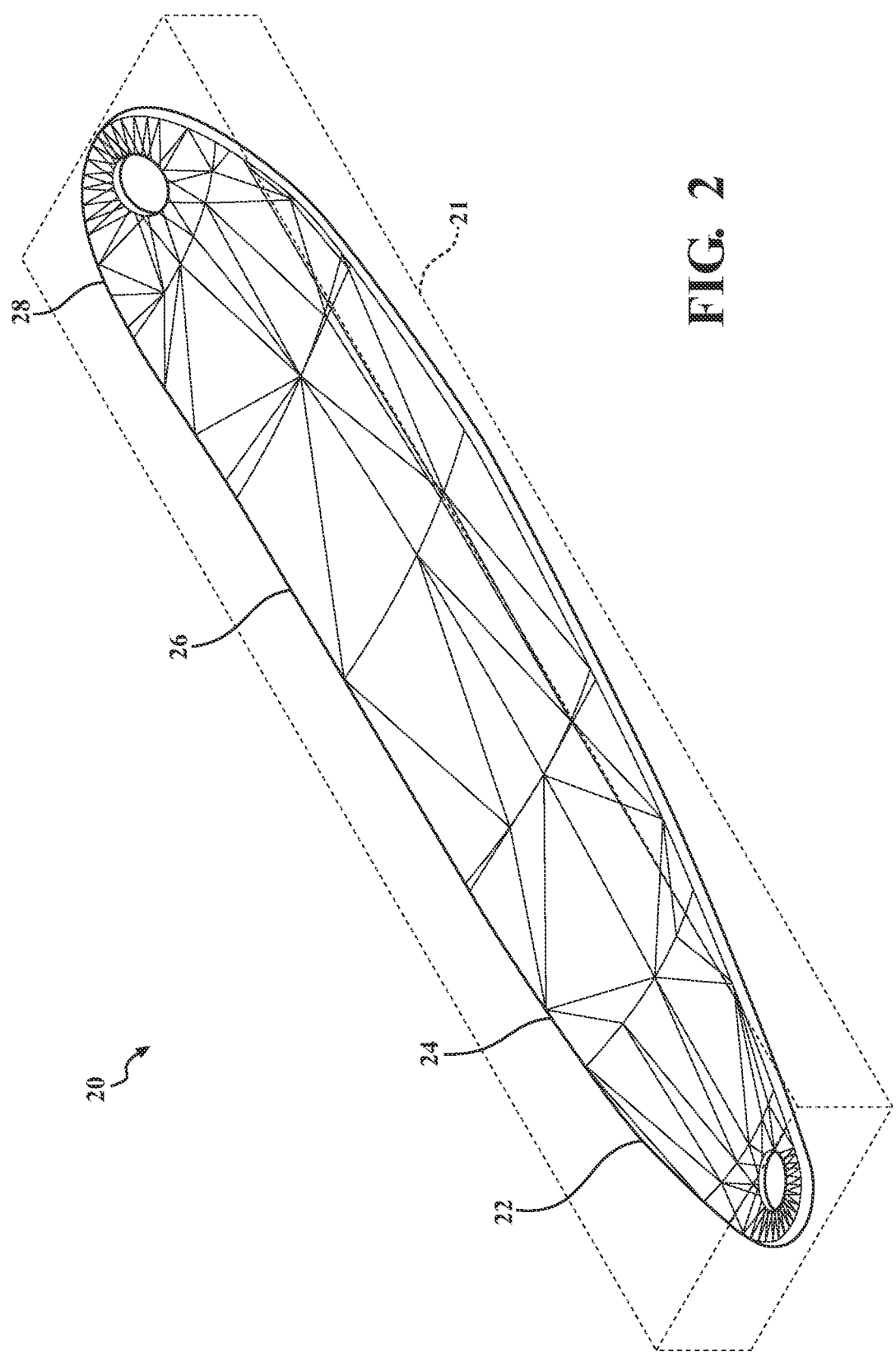
FIG. 2 schematically illustrates in perspective view an alternative embodiment of a fishing lure spoon body including features configured for creating hydrodynamic lift acting upon the fishing lure spoon body, in accordance with the present disclosure.

FIG. 2 schematically illustrates in perspective view an alternative embodiment of a fishing lure spoon body 20 including features configured for creating hydrodynamic lift acting upon the fishing lure spoon body 20. The illustrated fishing lure spoon body 20 includes four exemplary sections, a relatively flat forward section 22 including an attachment feature capable of being secured to a fishing line, a longitudinally flat central section 26 offset from the relatively flat forward section 22, an S-shaped section 24 transitioning between the relatively flat forward section 22, and a trailing edge portion 28. A construction line box 21 is drawn around the perspective view of the fishing lure spoon body 20 for purposes of illustration.

The sections 22, 24, 26, and 28 of the fishing lure spoon body 20 act similarly to the sections 12, 14, 16, and 18 of the fishing lure spoon body 10 of FIG. 1.

Figure 3:
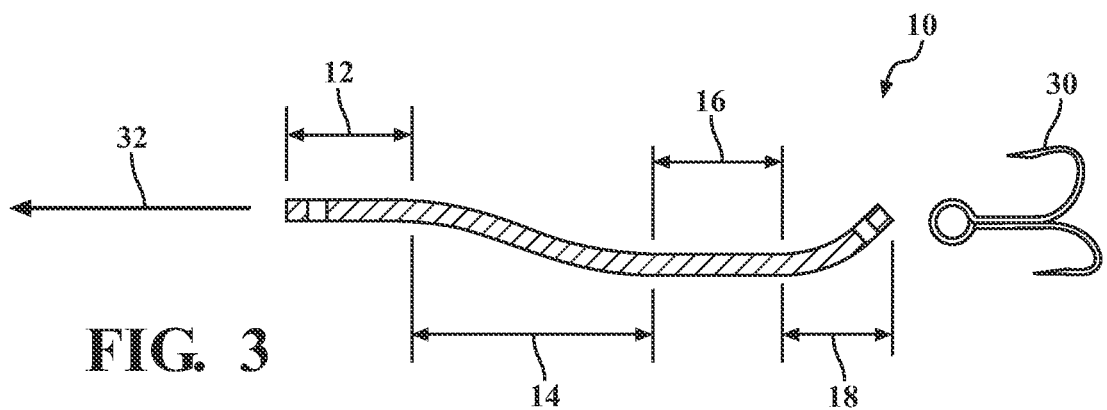
FIG. 3 schematically illustrates the fishing lure spoon body of FIG. 1 in cross-sectional view, in accordance with the present disclosure.

FIG. 3 schematically illustrates the fishing lure spoon body 10 of FIG. 1 in cross-sectional view. The illustrated fishing lure spoon body 10 includes four exemplary sections, a relatively flat forward section 12 including an attachment feature capable of being secured to a fishing line, a longitudinally flat central section 16 offset from the relatively flat forward section 12, an S-shaped section 14 transitioning between the relatively flat forward section 12, and a trailing edge portion 18. An arrow 32 is provided illustrating a nominal direction from which a fishing line may apply a pulling force upon the fishing lure spoon body 10. An exemplary treble hook 30 is illustrated in an aft or rearward position relative to the fishing lure spoon body 10.

Figure 4:
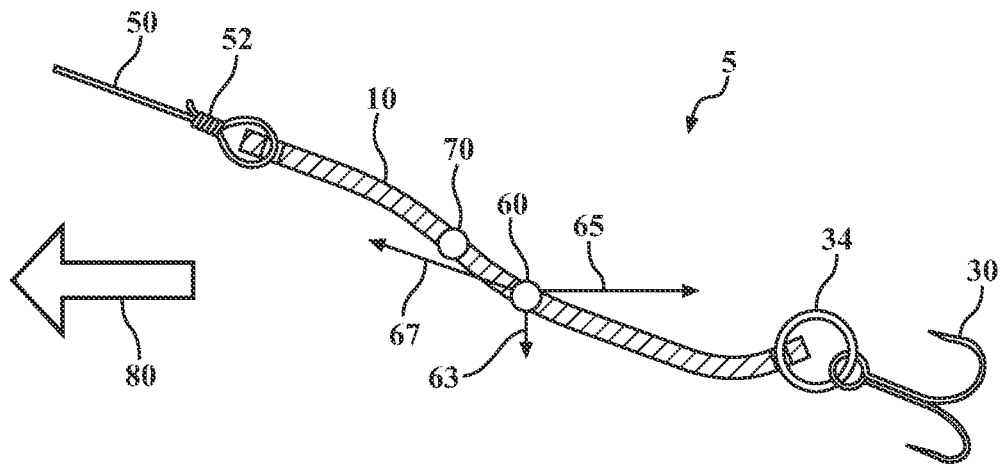
FIG. 4 schematically illustrates a fishing lure including the fishing lure spoon body of FIG. 1 in cross-sectional view, illustrating forces acting upon the fishing lure spoon body as the fishing lure is pulled through water while, for purposes of illustration, neglecting a hydrodynamic lift force upon the fishing lure spoon body, in accordance with the present disclosure.

FIG. 4 schematically illustrates a fishing lure 5 including the fishing lure spoon body 10 of FIG. 1 in cross-sectional view, illustrating forces acting upon the fishing lure spoon body 10 as the fishing lure 5 is pulled through water while, for purposes of illustration, neglecting a hydrodynamic lift force upon the fishing lure spoon body 10. In one embodiment, the fishing lure spoon body 10 may be being pulled through water at a low speed, where any hydrodynamic lift upon the fishing lure spoon body 10 may be negligible or too small to have a significant effect upon the fishing lure 5. The fishing lure spoon body 10 is illustrated including a center of mass 60 and a center of lift 70. The fishing lure 5 further includes the treble hook 30 and an attachment ring 34 connecting the treble hook 30 to the fishing lure spoon body 10. A fishing line 50 is further illustrated attached to the fishing lure spoon body 10 with an exemplary knot 52. The fishing lure 5 is being pulled through the water by the fishing line 50, although as a result of a force of weight represented by force vector 63, the fishing lure 5 is moving a direction 80 which is at an angle relative to the fishing line 50. A force of drag represented by force vector 65 is illustrated acting upon the fishing lure spoon body 10. A pulling force represented by force vector 67 is illustrated acting upon the fishing lure spoon body 10. The force vectors 63, 65, and 67 may be summed and may result in a net zero force acting upon the fishing lure spoon body 10. Such a fishing lure 5 would be likely to travel in direction 80 at a constant speed in equilibrium.

Figure 5:
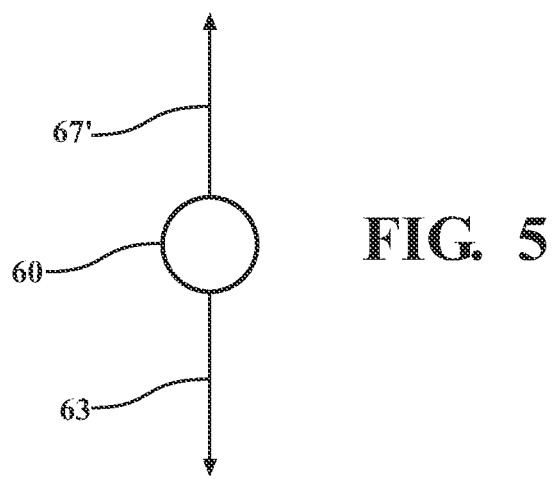
FIG. 5 illustrates the center of mass of the fishing lure spoon body of FIG. 4, illustrating an effect of vertical forces acting upon the fishing lure spoon body while, for purposes of illustration, neglecting a hydrodynamic lift force upon the fishing lure spoon body, in accordance with the present disclosure.

FIG. 5 illustrates the center of mass 60 of the fishing lure spoon body 10 of FIG. 4, illustrating an effect of vertical forces acting upon the fishing lure spoon body 10 while, for purposes of illustration, neglecting a hydrodynamic lift force upon the fishing lure spoon body. Force vector 63 representing the force of weight acting upon the center of mass 60 in a downward direction is illustrated. Force vector 67' indicating a vertical component of the pulling force acting upon fishing lure spoon body 10 is additionally illustrated. The force vectors 63 and 67' act in equal and opposite directions upon the center of mass 60, showing that the fishing lure spoon body 10 should be in a stable equilibrium in the conditions of FIG. 4.

Figure 6:
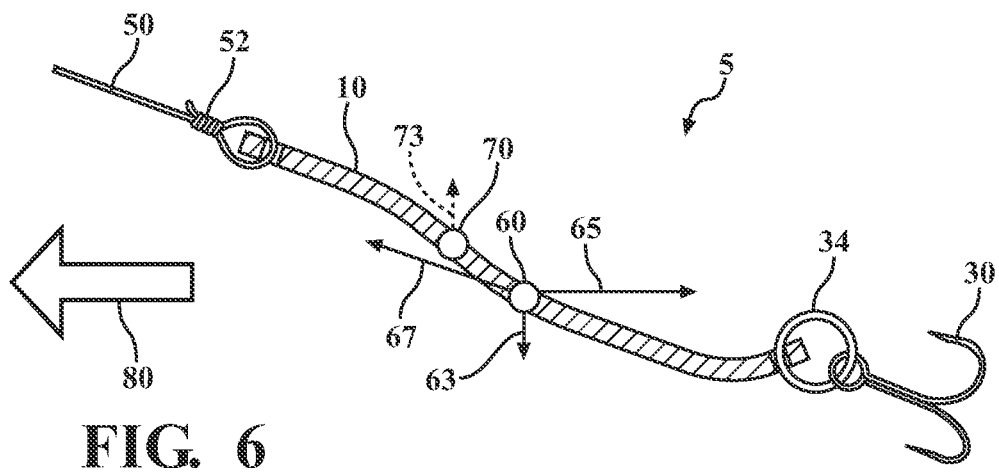
FIG. 6 schematically illustrates the fishing lure of FIG. 4 in cross-sectional view, illustrating forces acting upon the fishing lure spoon body as the fishing lure is pulled through water including a hydrodynamic lift force acting upon the fishing lure spoon body, in accordance with the present disclosure.

FIG. 6 schematically illustrates the fishing lure 5 of FIG. 4 in cross-sectional view, illustrating forces acting upon the fishing lure spoon body 10 as the fishing lure 5 is pulled through water including a hydrodynamic lift force acting upon the fishing lure spoon body 10. The fishing lure spoon body 10 is illustrated including a center of mass 60 and a center of lift 70. The fishing lure 5 further includes the treble hook 30 and an attachment ring 34 connecting the treble hook 30 to the fishing lure spoon body 10. A fishing line 50 is further illustrated attached to the fishing lure spoon body 10 with an exemplary knot 52. The fishing lure 5 is moving a direction 80. A force of drag represented by force vector 65 is illustrated acting upon the fishing lure spoon body 10. A pulling force represented by force vector 67 is illustrated acting upon the fishing lure spoon body 10. The force vectors 63, 65, and 67 may be summed and may result in a net zero force acting upon the fishing lure spoon body 10. An additional force vector 73 is illustrated acting upon the center of lift 70 representing a vertical component of a hydrodynamic lift acting upon the fishing lure spoon body 10.

Figure 7:
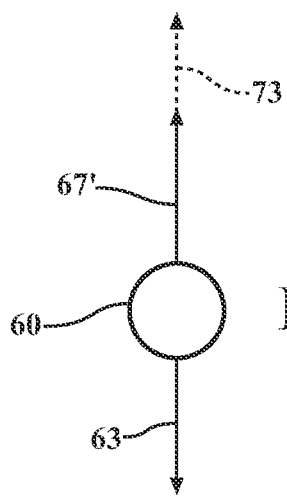
FIG. 7 illustrates the center of mass of the fishing lure spoon body of FIG. 6, illustrating an effect of vertical forces acting upon the fishing lure spoon body including a hydrodynamic lift force upon the fishing lure spoon body, in accordance with the present disclosure.

FIG. 7 illustrates the center of mass 60 of the fishing lure spoon body 10 of FIG. 6, illustrating an effect of vertical forces acting upon the fishing lure spoon body including a hydrodynamic lift force upon the fishing lure spoon body. Force vector 63 representing the force of weight acting upon the center of mass 60 in a downward direction is illustrated. Force vector 67' indicating a vertical component of the pulling force acting upon fishing lure spoon body 10 is additionally illustrated. The force vectors 63 and 67' act in equal and opposite directions upon the center of mass 60. An additional force vector 73 is illustrated acting upon the center of lift 70 representing a vertical component of a hydrodynamic lift acting upon the fishing lure spoon body 10. When the force vector 73 is added to the center of mass 60, representing an upward force of hydrodynamic lift acting upon the fishing lure spoon body 10, the fishing lure spoon body 10 is being acted upon by an unbalanced force, meaning that a net upward force is acting upon the fishing lure spoon body 10. According to Newton's Second Law of Motion, force equals mass times acceleration. In other words, the net upward force upon the fishing lure spoon body 10 causes the fishing lure 5 to move upward.

Figure 8:
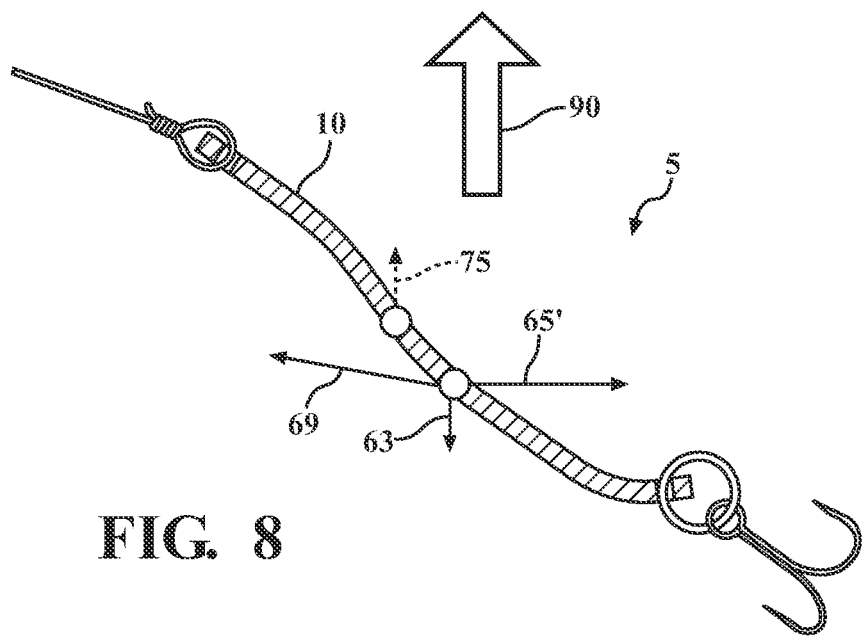
FIG. 8 schematically illustrates the fishing lure of FIG. 6 in cross-sectional view, illustrating a resulting upward movement of the fishing lure as a result of the hydrodynamic lift force, in accordance with the present disclosure.

FIG. 8 schematically illustrates the fishing lure 5 of FIG. 6 in cross-sectional view, illustrating a resulting upward movement of the fishing lure 5 as a result of the hydrodynamic lift force. The fishing lure 5 is illustrated including the fishing lure spoon body 10. As a result of the conditions illustrated in FIG. 6, the fishing lure has moved upwardly in direction 90. The fishing lure 5 has additionally tilted upwardly, with a forward portion of the fishing lure 5 being moved upwardly relative to a rearward portion of the fishing lure 5. This upward tilt is caused by the center of lift 70 of FIG. 6 being forward of the center of gravity 60, resulting in the lifting force applying a moment force or a force creating a rotation upward in the lure 5. As a result, fishing line and the resulting pulling force are in a more horizontal direction as compared to the pulling force of FIG. 6, as represented by force vector 69. As a result of the fishing lure 5 tilting upwardly, a force of drag represented by force vector 65' has increased as compared to the force of drag in FIG. 6. The hydrodynamic lift represented by force vector 75 changes as a result of a different orientation of the fishing lure spoon body to oncoming water. As the fishing lure changes position and orientation in the water, the forces acting upon the fishing lure spoon body 10 may change, and as a result, the hydrodynamic lift acting to lift the lure in the water may be interrupted, thereby allowing the fishing lure 5 to plunge to an original depth and start the lifting cycle over again.

Figure 9:
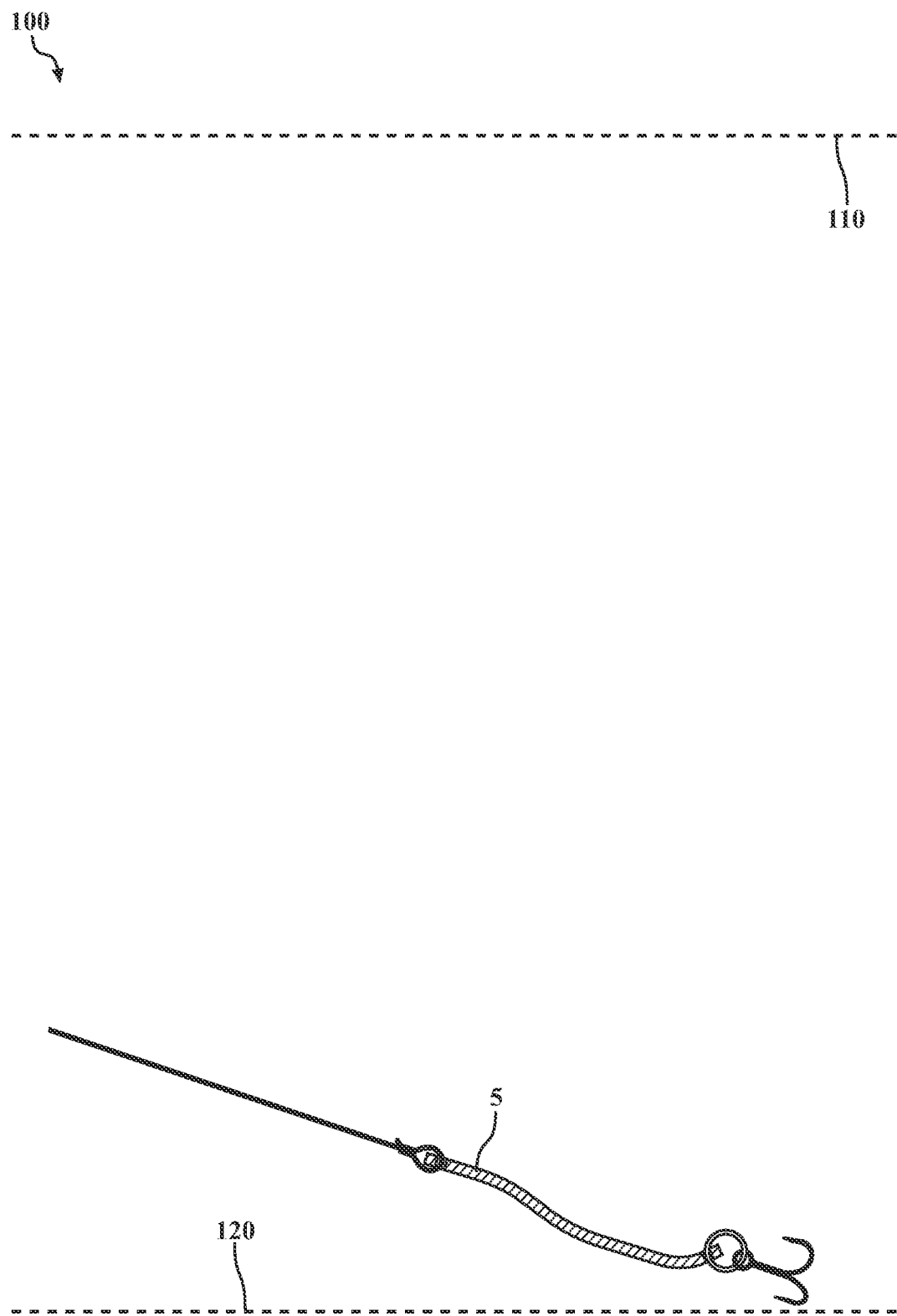
FIGS. 9-12 schematically illustrate a cycle of the fishing lure of FIG. 4 rising and falling through water as the fishing lure is pulled through water, in accordance with the present disclosure.
Figure 10:
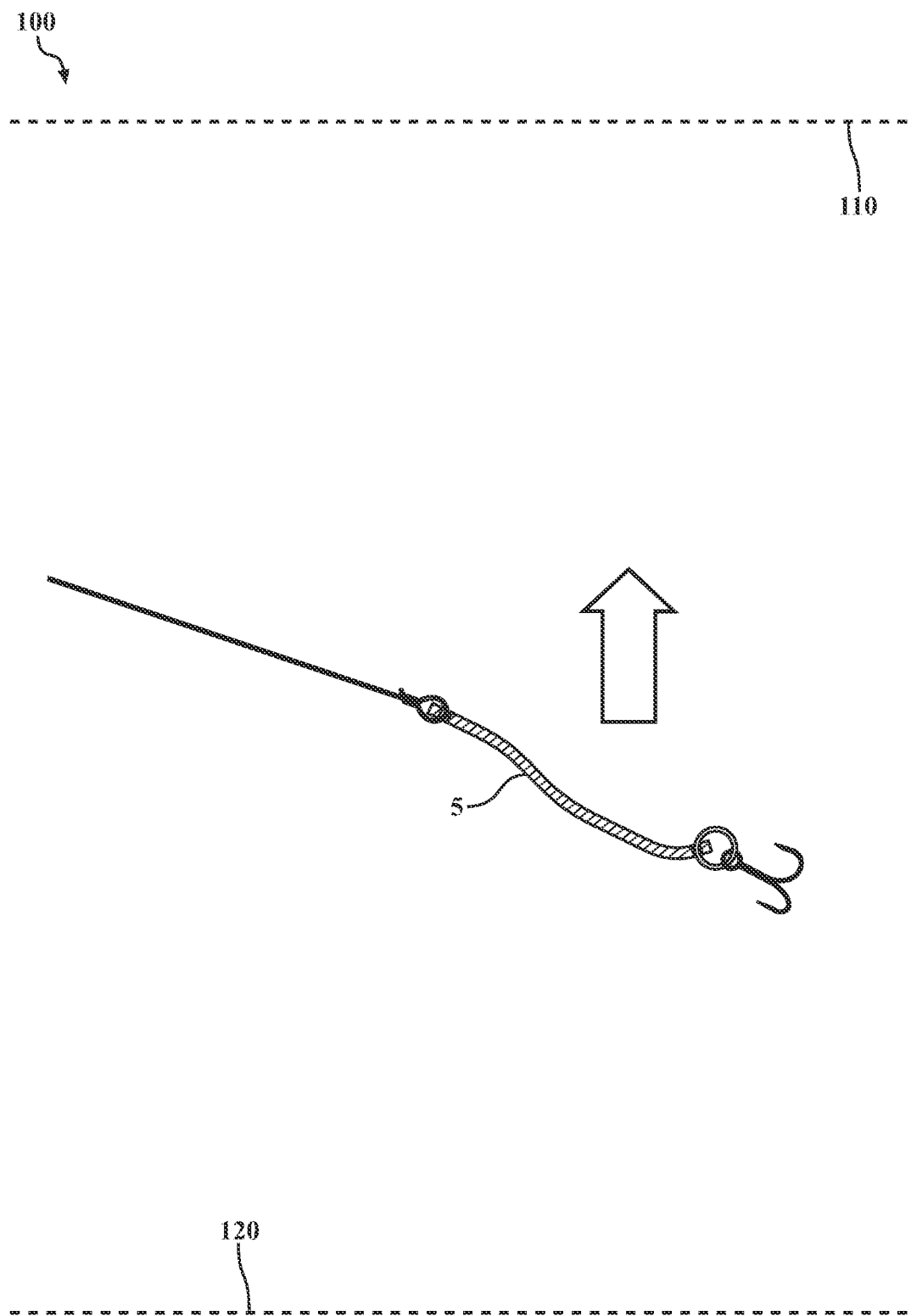
Figure 11:
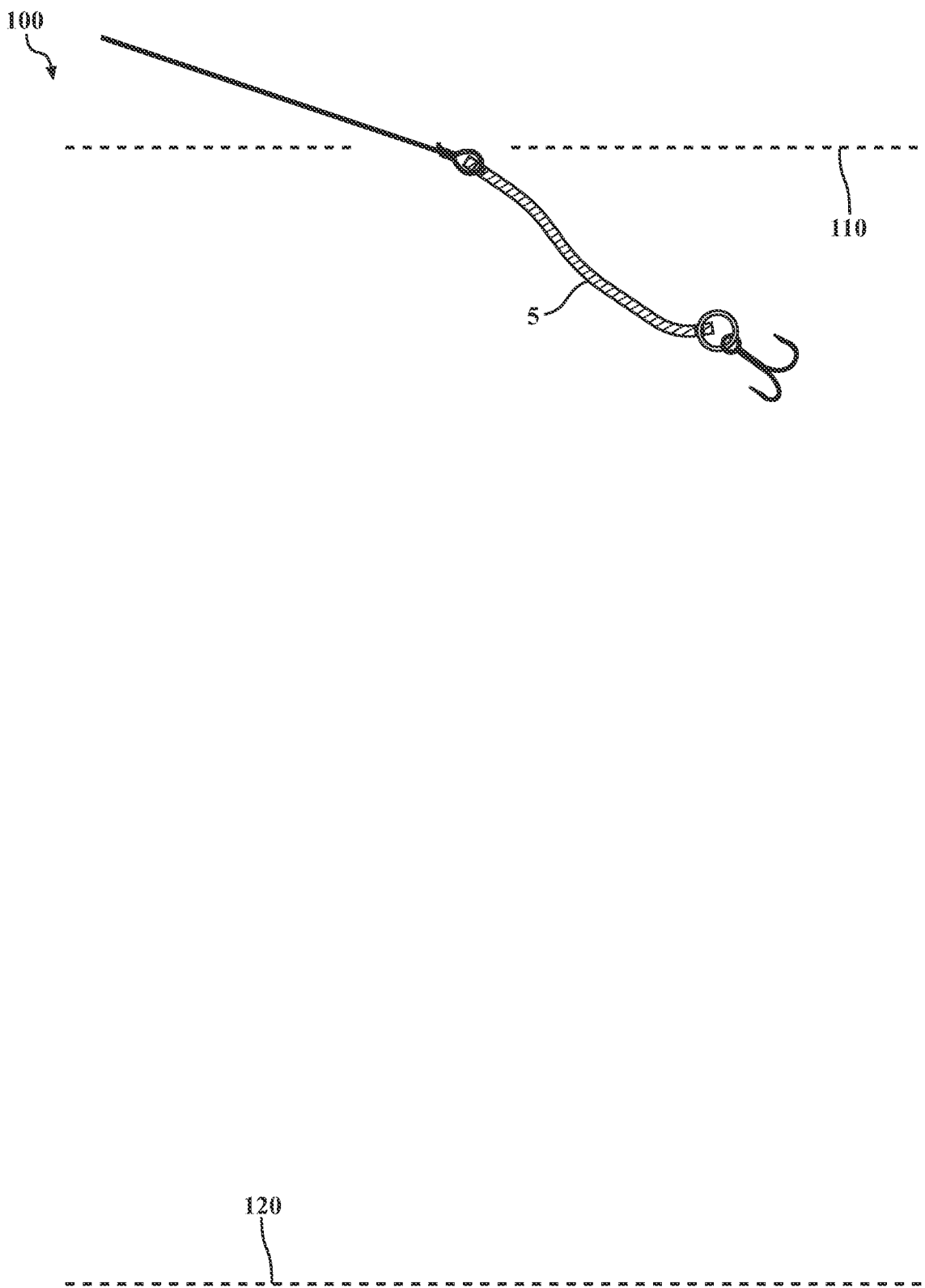
Figure 12:
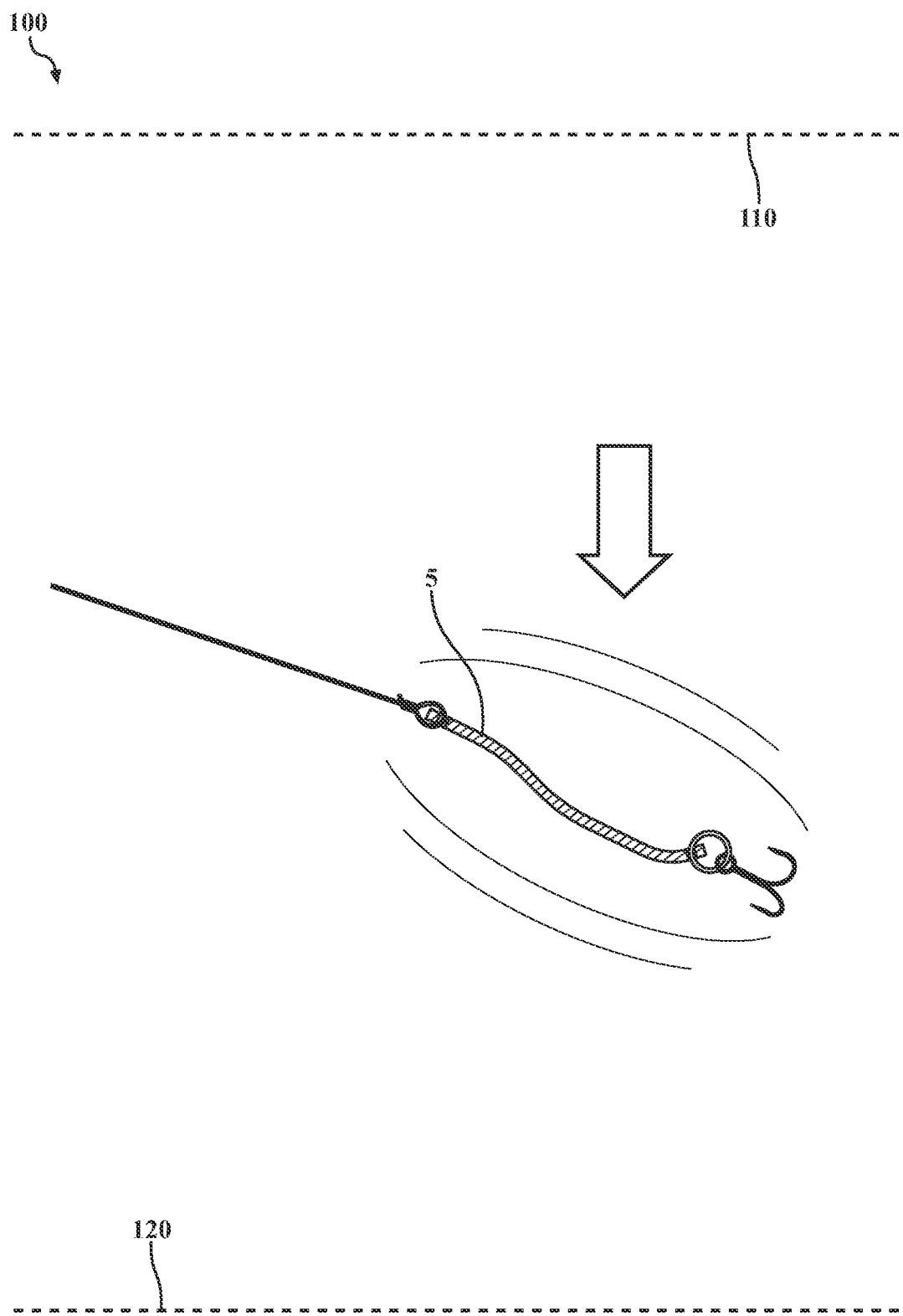

FIGS. 9-12 schematically illustrate a cycle of the fishing lure 5 of FIG. 4 rising and falling through water as the fishing lure is pulled through water. Configuration 100 illustrates the fishing lure 5 traveling through water between a lowest level 120 of travel and a highest level 110 of travel. FIG. 9 illustrates the fishing lure 5 at a lowest level 120 of travel through water. Weight of the fishing lure 5 in balance with hydraulic drag balance each other such that the fishing lure 5 dangles or travels at the lowest level 120. Further the weight and off-center features of the fishing lure 5 causes the lure to orient according to the illustrations herein. FIG. 10 illustrates the fishing lure 5 rising through the water above the lowest level 120 upwards toward the highest level 110 as a result of hydrodynamic lift, as described herein. FIG. 11 illustrates the fishing lure 5 reaching a highest level 110 of travel, wherein the effect of the hydrodynamic lift is countered by several factors, and the fishing lure 5 ceases to travel upward. The fishing lure 5 destabilizes and, as is illustrated in FIG. 12, turbulently falls back down to the lowest level 120 until the balance of weight and drag reset the fishing lure 5 to the condition of FIG. 9, wherein the illustrated cycle may repeat.

The fishing lure 5 of FIG. 4 and throughout the disclosure may include a variety of dimensions. A length of the fishing lure spoon body 10 of FIG. 1 may be measured along a longitudinal length of the fishing lure spoon body 10. In one embodiment, the longitudinal length may be measured horizontally while the longitudinally flat central section 16 of FIG. 1 is resting on a flat horizontal surface. A width of the fishing lure spoon body 10 may be defined at a widest portion of the fishing lure spoon body 10 and measured in a direction perpendicular to the longitudinal length. A width to length ratio may, in some embodiments, be in a range from 0.18 to 0.22. Stated differently, a width of the fishing lure spoon body may be in a range from 18% to 22% as compared to a longitudinal length of the fishing lure spoon body.

While the best modes for carrying out the disclosure have been described in detail, those familiar with the art to which this disclosure relates will recognize various alternative designs and embodiments for practicing the disclosure within the scope of the appended claims.

What is claimed is:
1. A fishing lure, comprising:
 a fishing lure spoon body including a cross-sectionally defined longitudinal shape including:
  a flat forward section including an attachment feature capable of being secured to a fishing line;
  a longitudinally flat central section parallel to and offset from the flat forward section;

a curved section connected to and transitioning between the flat forward section and the longitudinally flat central section parallel to the flat forward section; and a trailing edge portion curving toward the flat forward section; and at least one hook;

wherein the fishing lure spoon body is convex upon a first side and concave upon a second side;

wherein the curved section is disposed longitudinally forward of a center of mass of the fishing lure spoon body resulting in a center of lift for the fishing lure spoon body being disposed longitudinally forward of the center of mass of the fishing lure spoon body; and wherein the fishing lure spoon body is configured for creating hydrodynamic lift which results in the fishing lure oscillating between rising and falling when the fishing lure spoon body is pulled through the water.

2. The fishing lure of claim 1, wherein at least the longitudinally flat central section and the curved section are arcuate and each include raised rims and a depressed center.

3. The fishing lure of claim 1, wherein the fishing lure spoon body includes a uniform thickness.

4. The fishing lure of claim 1, wherein a width of the fishing lure spoon body may be in a range from 18% to 22% as compared to a longitudinal length of the fishing lure spoon body.

5. A fishing lure system, comprising:
a fishing line including a longitudinal axis of the fishing line; and
a fishing lure connected to the fishing line, including:
a fishing lure spoon body including a cross-sectionally defined longitudinal shape including:
a flat forward section configured to be in line with the longitudinal axis of the fishing line when the fishing lure is pulled through water;
a longitudinally flat central section parallel to and offset from the longitudinal axis of the fishing line and the flat forward section;
a curved section connected to and transitioning between the flat forward section and the longitudinally flat central section parallel to the flat forward section; and
a trailing edge portion curving toward the flat forward section; and
at least one hook;

wherein the fishing lure spoon body is convex upon a first side and concave upon a second side;

wherein the curved section is disposed longitudinally forward of a center of mass of the fishing lure spoon body which results in a center of lift for the fishing lure spoon body being disposed longitudinally forward of the center of mass of the fishing lure spoon body; and wherein the fishing lure spoon body is configured for creating hydrodynamic lift which results in the fishing lure oscillating between rising and falling when the fishing lure spoon body is pulled through the water.

6. The fishing lure system of claim 5, wherein at least the longitudinally flat central section and the curved section are arcuate and each include raised rims and a depressed center.

7. The fishing lure system of claim 5, wherein the fishing lure spoon body includes a uniform thickness.

8. The fishing lure system of claim 5, wherein a width of the fishing lure spoon body may be in a range from 18% to 22% as compared to a longitudinal length of the fishing lure spoon body.

9. A fishing lure spoon body, comprising:
a cross-sectionally defined longitudinal shape including:
a flat forward section including an attachment feature capable of being secured to a fishing line;
a longitudinally flat central section parallel to and offset from the flat forward section;
a curved section connected to and transitioning between the flat forward section and the longitudinally flat central section parallel to the flat forward section; and
a trailing edge portion curving toward the flat forward section; and wherein the fishing lure spoon body is convex upon a first side and concave upon a second side;

wherein the curved section is disposed longitudinally forward of a center of mass of the fishing lure spoon body which results in a center of lift for the fishing lure spoon body being disposed longitudinally forward of the center of mass of the fishing lure spoon body; and wherein the fishing lure spoon body is configured for creating hydrodynamic lift which results in the fishing lure spoon body oscillating between rising and falling when the fishing lure spoon body is pulled through the water.

10. The fishing lure spoon body of claim 9, wherein at least the longitudinally flat central section and the curved section are arcuate and each include raised rims and a depressed center.

11. The fishing lure spoon body of claim 9, wherein the fishing lure spoon body includes a uniform thickness.

12. The fishing lure spoon body of claim 9, wherein a width of the fishing lure spoon body may be in a range from 18% to 22% as compared to a longitudinal length of the fishing lure spoon body.

* * * * *